United States Patent
Black

[11] 3,864,940
[45] Feb. 11, 1975

[54] FLEXIBLE COUPLING MEANS
[75] Inventor: Arthur L. Black, Corning, N.Y.
[73] Assignee: Ingersoll-Rand Company, Woodcliff Lake, N.J.
[22] Filed: Aug. 1, 1973
[21] Appl. No.: 384,449

[52] U.S. Cl. .................................... 64/13, 64/12
[51] Int. Cl. .................................... F16d 3/78
[58] Field of Search ........................ 64/12, 13, 19

[56] References Cited
UNITED STATES PATENTS

| 349,365 | 9/1886 | Roots | 64/13 |
| 1,639,480 | 8/1927 | Baumann | 64/13 |
| 1,676,333 | 7/1928 | Kattwinkel | 64/19 |
| 1,887,538 | 11/1932 | Bond | 64/13 |
| 2,550,580 | 4/1951 | McLeod et al. | 64/12 |
| 3,124,942 | 3/1964 | Rothfuss et al. | 64/13 |

FOREIGN PATENTS OR APPLICATIONS

| 23,187 | 11/1906 | Great Britain | 64/12 |
| 169,727 | 12/1951 | Germany | 64/13 |
| 11,704 | 2/1906 | Great Britain | 64/13 |

Primary Examiner—Samuel Scott
Assistant Examiner—Randall Heald
Attorney, Agent, or Firm—Bernard J. Murphy

[57] ABSTRACT

The means comprises an annulus having a throughgoing bore, for receiving a shaft from which annulus a plurality of radial limbs projects for coupling thereof to like limbs of a complementary coupling means. The limbs are flexible axially, although they are relatively inflexible circumferentially or laterally and torsionally. The annulus or hub incorporates a journal for bearing-mounting of the shaft and coupling means within a housing or the like. One of such coupling means is replaceably couplable to a complementary (mirror-image) coupling means carried by another shaft.

4 Claims, 3 Drawing Figures

PATENTED FEB 11 1975

3,864,940

FLEXIBLE COUPLING MEANS

This invention pertains to a flexible coupling for shafts where such shafts are subject to angular misalignment relative to the desired alignment axis thereof.

In the prior art it is already well known, as described in U.S. Pat. No. 2,855,767, issued Oct. 14, 1958 to K. G. Ahlen for a "Yieldable Coupling," to provide a bored hub with radial fingers or limbs for effecting a flexible coupling between shafts. However, as exemplified in U.S. Pat. No. 2,855,767, it has been customary, heretofore, to provide a journal for one of the coupled shafts at a spaced-apart location from, and separate from, the flexible coupling component. So also, such known couplings have relatively inaccessible fastening means which frustrates a simple maintenance and disassembly of shafts coupled thereby. Accordingly, having to provide independent means for journaling of a shaft and independent means for coupling thereof to another such shaft requires additional, space-consuming, axial length. I have discovered that, where a flexible coupling can incorporate a journal for a shaft, the axial length of the shaft can be foreshortened and a more efficient, economical, and compact arrangement is provided thereby. So also, I have devised such an arrangement which readily lends itself to simple, facile disassembly.

Accordingly, it is an object of this invention to set forth an improved flexible coupling by incorporating therein a journal for the shaft, for coupling thereof to a like shaft.

It is another object of this invention to set forth flexible coupling means, for use in coupling together first and second rotary elements, comprising journal means for supporting one of the rotary elements in a bearing for rotation about an axis; and a plurality of axially flexible limbs, integral with, and extending radially from, said journal means, for coupling thereof to like limbs of a complementary, flexible coupling means supporting the other of the first and second rotary elements.

A feature of this invention comprises an annulus having a throughgoing bore, for receiving a shaft from which annulus a plurality of radial limbs projects for coupling thereof to like limbs of a complementary coupling means. The limbs are flexible axially, although they are relatively inflexible circumferentially or laterally and torsionally. The annulus or hub incorporates a journal for bearing-mounting of the shaft and coupling means within a housing or the like. One of such coupling means is replaceably couplable to a complementary (mirror-image) coupling means carried by another shaft.

Further objects and features of this invention will become more apparant by reference to the following description taken in conjunction with the accompanying figures in which.

Figure 1:
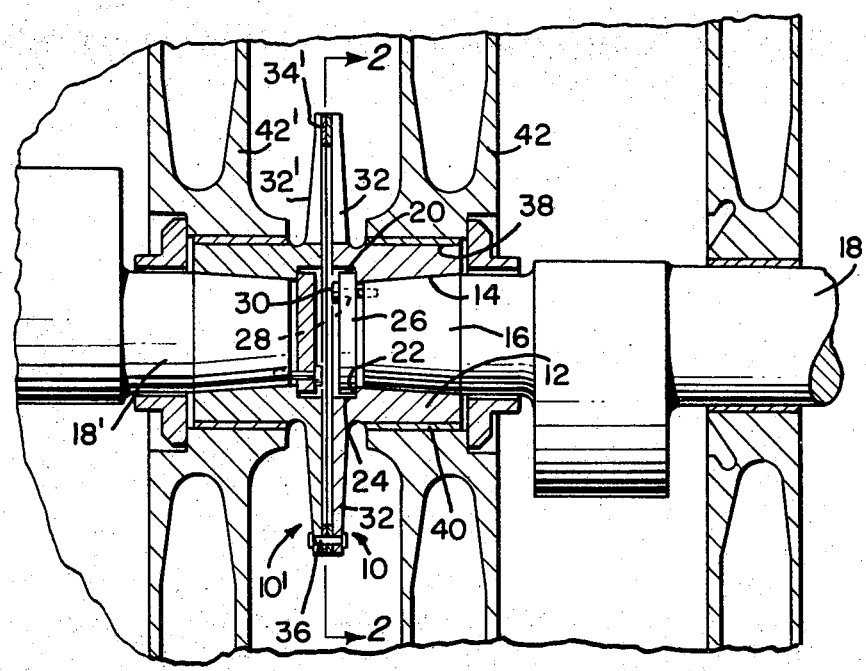
FIG. 1 is an axial illustration, partly in cross-section, of two shafts coupled together by means of an embodiment of the invention, taken along section 1—1 of FIG. 2.
Figure 2:
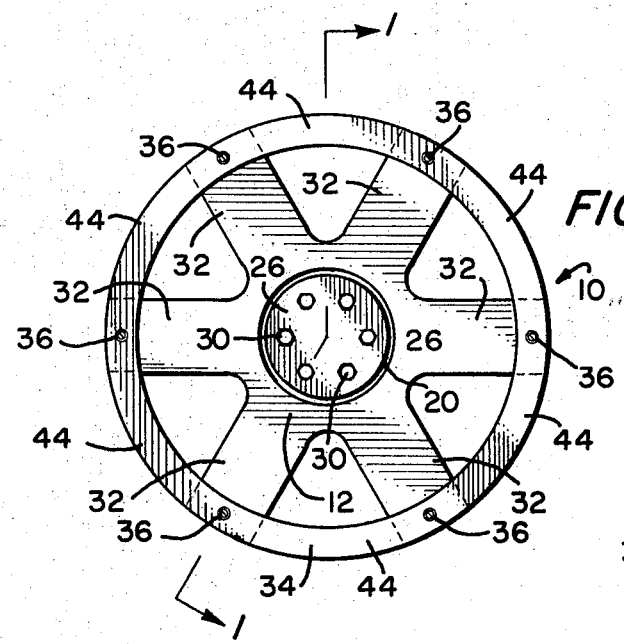
FIG. 2 is a view of the novel coupling means deployed in FIG. 1, taken along section 2—2 of FIG. 1.
Figure 3:
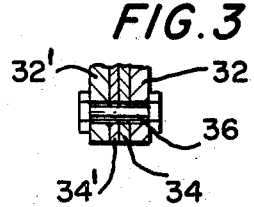
FIG. 3 is an enlarged, fragmentary view of the details of the ring-interface and bolting.

As shown in the figures, the novel flexible coupling means 10 comprises a hub or annulus 12 which is bored through, at 14, to recieve the axial end 16 of a first shaft 18. The bore 14 is tapered and, at the coupling end thereof has a recess 20 defined by an annular shoulder 22, bounded by a wall 24 which receives a retainer plate 26. The plate 26 is received in the recess 20 and has bolt holes 28 formed therein for receiving fasteners 30 for securing the axial end of the shaft. Alternatively, bore 14 could be straight, i.e., of uniform diameter, and have an interference or shrink fit on a straight shaft end 16.

The hub or annulus 12 has a plurality of spaced-apart limbs 32 for coupling thereof to like limbs of a complementary flexible coupling means. A ring 34 is fixed about the radially outermost ends of the limbs, and is bored through, whereat it transverses the outermost ends of the limbs, for receiving coupling bolts 36 in order that the ring 34 and the limbs 32 associated therewith will define an interface with a ring 34' and associated limbs 32' of a coupling means 10' for a second shaft 18'.

The hub or annulus 12 defines an integral bearing journal 38 and, accordingly supports the shaft 18 and itself within a bearing 40 disposed thereabout within a machinery housing 42.

Two housings 42 and 42' are shown side by side, in FIG. 1, and it will be appreciated that one housing can be angularly disoriented relative to the other and yet the coupling, and the torque transmitted from one shaft 18 or 18' to the other thereof will be uneffected. The limbs 32 have sufficient width to render them relatively inflexible torsionally as well as circumferentially or laterally. Yet, they are sufficiently thin to exhibit an axial flexibility. The ring 34 provides or defines arcuate strengthening ribs or webs 44 between adjacent limbs 32. The use of the ring 34 is optional; alternatively, a coupling means 10 can be coupled directly to its complement, means 10', by bolts 36 secured only to limbs 32 and 32'. In that the coupling bolts 36 are outwardly or radially deployed, the decoupling of the shafts 18 and 18' is easily effected.

As required, and as necessary to adjust for spacing therebetween, shims of annular configuration, for instance, can be interposed between the interfaced rings 34 and 34' of the coupling means 10 and 10'.

While I have described my invention in connection with a specific embodiment thereof, it is to be clearly understood that this is done only by way of example and not as a limitation to the scope of my invention as set forth in the objects thereof and in the appended claims.

I claim:

1. Flexible coupling means
   for use in coupling together first and second rotary elements, comprising:
   journal means for supporting one of the rotary elements in a bearing for rotation about an axis; and
   a plurality of axially flexible limbs, integral with, and extending radially from, said journal means, for coupling thereof to like limbs of a complementary, flexible coupling means supporting the other of the first and second rotary elements; wherein
   said journal/supporting means comprises a hub;
   said hub defining an annulus having a central, throughgoing bore for receiving an axial end portion of said one rotary element therewithin;

said securing means comprises means for retaining said end portion within said bore;

said bore is tapered, and further has an annular shoulder formed therewithin;

said shoulder is bounded by a wall;

said shoulder and wall define a recess for receiving said securing means therewithin;

said securing means comprises a retainer plate;

said plate having at least one bore hole formed therein for receiving a rotary-element-engaging fastener therethrough; and said limbs have bolt holes formed therein adjacent the radial outermost ends thereof, for receiving fasteners for replaceable coupling of said limbs to like limbs of a complementary, flexible coupling means.

2. Flexible coupling means, according to claim 1, further including:

a ring fixed to said limbs, about the radially outermost ends thereof, said ring definiing arcuate strengthing ribs or webs between adjacent limbs.

3. Flexible coupling means, according to claim 2, wherein:

said ring tranverses said limbs at the outermost ends thereof; for effecting an interface with a like ring of a complementary, flexible coupling means.

4. Flexible coupling means, according to claim 3, wherein:

said limbs and said ring have bolt holes formed therein, whereat said ring tranverses said limbs, for receiving fasteners for replaceable coupling of said limbs and ring to a like ring and limbs of a complementary, flexible coupling means.

* * * * *